United States Patent
Schultz et al.

(10) Patent No.: US 9,560,076 B2
(45) Date of Patent: Jan. 31, 2017

(54) SECURE TRUST-SCORED DISTRIBUTED MULTIMEDIA COLLABORATION SESSION

(71) Applicant: Verizon Patent and Licensing Inc., Basking Ridge, NJ (US)

(72) Inventors: Paul T. Schultz, Colorado Springs, CO (US); Robert A. Sartini, Colorado Springs, CO (US); James J. Ni, Westford, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/219,662

(22) Filed: Mar. 19, 2014

(65) Prior Publication Data

US 2015/0271206 A1 Sep. 24, 2015

(51) Int. Cl.

| | |
|---|---|
| *H04L 29/06* | (2006.01) |
| *H04L 12/18* | (2006.01) |
| *G06F 21/60* | (2013.01) |
| *G06F 21/31* | (2013.01) |
| *H04L 12/58* | (2006.01) |
| *G06Q 10/06* | (2012.01) |
| *G06F 21/62* | (2013.01) |

(52) U.S. Cl.
CPC ............. *H04L 63/20* (2013.01); *G06F 21/31* (2013.01); *G06F 21/60* (2013.01); *G06F 21/6236* (2013.01); *G06Q 10/06* (2013.01); *H04L 12/1822* (2013.01); *H04L 12/1827* (2013.01); *H04L 51/12* (2013.01); *H04L 63/04* (2013.01); *H04L 63/08* (2013.01); *H04L 63/105* (2013.01)

(58) Field of Classification Search
CPC ........ H04L 63/20; H04L 63/08; H04L 63/105; H04L 63/04; H04L 65/403; G06F 21/60; G06F 21/31
See application file for complete search history.

(56) References Cited

U.S. PATENT DOCUMENTS

| | | | |
|---|---|---|---|
| 7,086,085 B1* | 8/2006 | Brown | G06F 21/6218 714/E11.207 |
| 8,417,935 B2* | 4/2013 | Bettger et al. | 713/150 |
| 2004/0107249 A1* | 6/2004 | Moser | G06Q 10/107 709/204 |
| 2010/0095122 A1* | 4/2010 | Bettger | H04L 12/1831 713/170 |
| 2010/0146618 A1* | 6/2010 | DelRocco | G06F 21/6245 726/12 |
| 2011/0179477 A1* | 7/2011 | Starnes | G06F 21/52 726/9 |
| 2014/0137190 A1* | 5/2014 | Carey | H04L 63/1433 726/3 |

* cited by examiner

*Primary Examiner* — Morshed Mehedi
*Assistant Examiner* — Vance Little

(57) ABSTRACT

A device may receive a request for a collaboration session. The device may authenticate a user for the collaboration session. The device may generate a trust-score associated with the collaboration session based on authenticating the user. The trust-score may be associated with a security level for the collaboration session. The security level may be associated with one or more capabilities of the collaboration session. The device may assign the user to a session role associated with the collaboration session. The session role may be associated with the one or more capabilities of the collaboration session. The device may provide information associated with the collaboration session based on the security level for the collaboration session and/or the session role assigned to the user.

20 Claims, 18 Drawing Sheets

| Context # | Whiteboard | Display | Keyboard | Camera | Voice I/O | Gesture I/O |
|---|---|---|---|---|---|---|
| 1 | X | X | X | X | X | X |
| 2 | X | X | X | X | X | |
| 3 | X | X | | | X | |
| 4 | X | X | X | X | X | X |
| 5 | X | X | | X | X | |
| 6 | X | X | | | | |
| 7 | X | X | X | | X | X |

FIG. 5

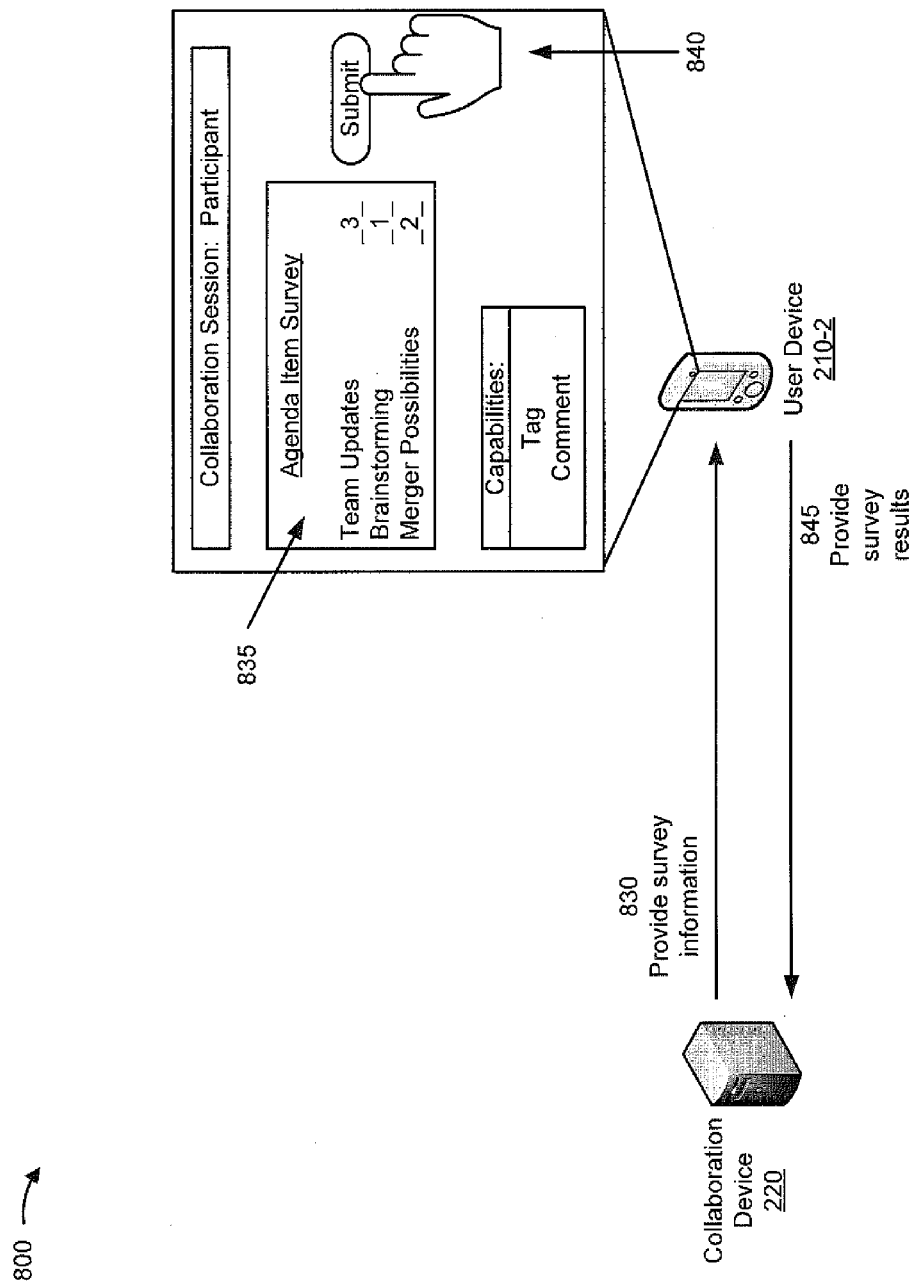

SECURE TRUST-SCORED DISTRIBUTED MULTIMEDIA COLLABORATION SESSION

BACKGROUND

A collaboration session between a first user and a second user may facilitate a conference call, a shared document review, a distributed presentation, or the like. The first user may access the collaboration session via a first user device utilizing a first network protocol from a first location, and the second user may access the collaboration session via a second user device utilizing a second network protocol from a second location.

BRIEF DESCRIPTION OF THE DRAWINGS

FIG. 5 is a diagram of an example data structure that stores information associated with determining a set of collaboration session capabilities to be provided to a user of a secure multimedia collaboration session;

FIGS. 8A-8C are diagrams of an example implementation relating to the example process shown in FIG. 7.

DETAILED DESCRIPTION OF PREFERRED EMBODIMENTS

The following detailed description of example implementations refers to the accompanying drawings. The same reference numbers in different drawings may identify the same or similar elements.

A first user and a second user may utilize a collaboration session for a conference call, for review of a shared-document, or the like. The first user may access the collaboration session from a first location, and may utilize a first network protocol (e.g., a Hypertext Transfer Protocol (HTTP), a secure HTTP (HTTPs), a file transfer protocol (FTP), a secure FTP (SFTP), etc.) for access via a first user device. The second user may access the collaboration session from a second location, and may utilize a second network protocol for access via a second user device. However, a collaboration session may include private information, such as secure personal information, business strategy information, client information, intellectual property information, or the like, that is to be concealed from particular users. Implementations described herein may prevent disclosure of private information by utilizing a dynamically adjustable trust-score determination to facilitate a secure multimedia collaboration session.

Figure 1A:
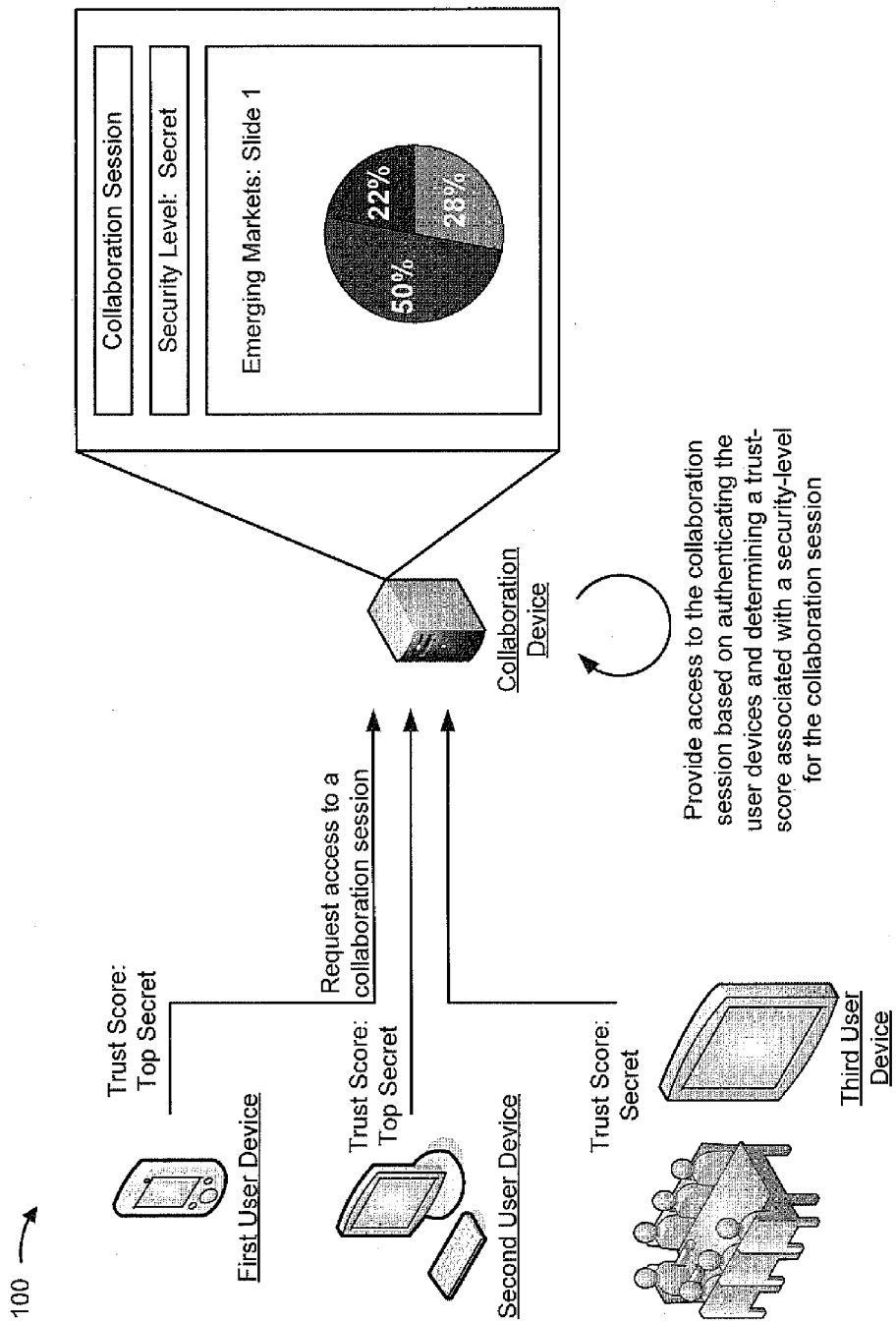
FIGS. 1A and 1B are diagrams of an overview of an example implementation described herein.
Figure 1B:
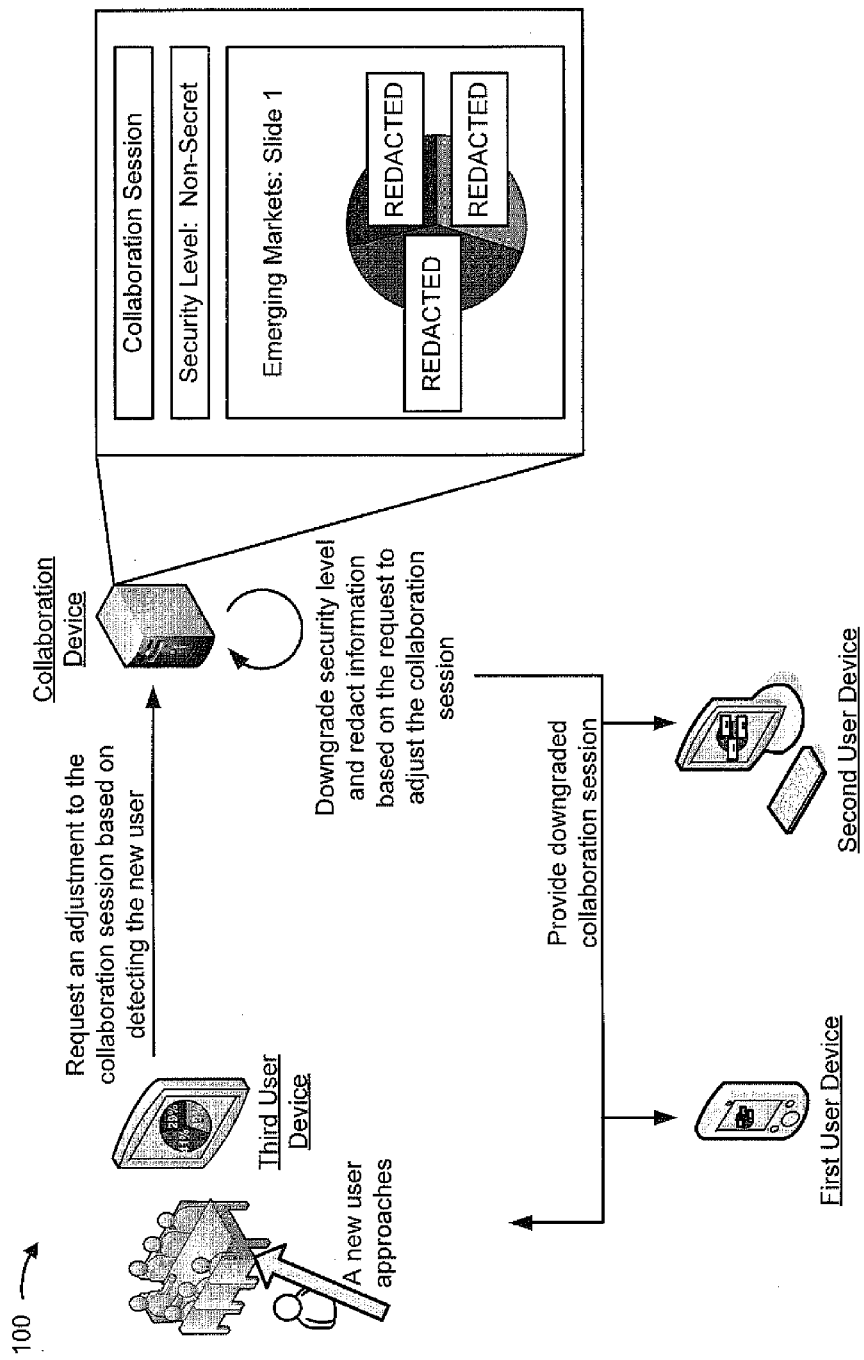

FIGS. 1A and 1B are diagrams of an overview of an example implementation 100 described herein. Example implementation 100 may include a set of user devices, such as a first user device, a second user device, and a third user device (e.g., a conferencing device located in a conference room with a set of conference users). As shown in FIG. 1A, the set of user devices may request access to a collaboration session. The set of user devices may provide information associated with requesting access to the collaboration session, such as network identification information, network protocol information, user authentication information, session role information, or the like. For example, the first user device may provide information relating to a first trust-score (e.g., correlating to a "Top Secret" security level for the collaboration session), the second user device may provide information relating to a second trust-score (e.g., correlating to a "Top Secret" security level for the collaboration session), and the third user device may provide information relating to a third trust-score (e.g., correlating to a "Secret" security level for the collaboration session). A trust-score may refer to an assessment (e.g., a quantification) of one or more trust-score factors associated with a user, a user device, a network, an environment, or the like, that may correspond to a particular security level for the collaboration session.

The collaboration device may authenticate users associated with the set of user devices. The collaboration device may determine a security level (e.g., a "Secret" security level) for the collaboration session based on the set of trust-scores. The collaboration device may assign the set of users to a set of session roles (e.g., a presenter role, a moderator role, a participant role, etc. associated with a set of collaboration session capabilities), and may provide access to the collaboration session.

As shown in FIG. 1B, a new user may enter a conference room in which the third user device is providing the collaboration session. The third user device may detect the new user (e.g., via a facial-recognition camera, via a microphone, via a near-field communication detection of a particular user device being utilized by the new user, via an indication by another user of the third user device, etc.). The third user device may request an adjustment to the collaboration session (e.g., to re-calculate the trust-score for the collaboration session, and downgrade the security level accordingly) based on detecting the new user. For example, the third user device may provide, to the collaboration device, information indicating that an environment associated with the third user device (e.g., the conference room) has changed (e.g., the new user has entered). In another example, the third user device may provide information indicating an adjustment to the collaboration session to conduct a poll of the other users, to provide another presentation slide, to have particular information tagged (e.g., audio tagged, visually tagged, etc.), to display particular information for particular users, or the like.

As further shown in FIG. 1B, the collaboration device may determine that the adjustment is authorized for the collaboration session. For example, the collaboration device may determine that the third user device is authorized to request that the security level associated with the collaboration session be downgraded. The collaboration device may recalculate the trust-score for the collaboration session, and may adjust the collaboration session (e.g., by downgrading the security level and redacting a screen-view of particular information). The collaboration device may provide information associated with the adjustment (e.g., the redacted screen-view of the collaboration session) to the set of user devices via the collaboration session. In another example, the collaboration device may request authentication information from the new user, and may upgrade the collaboration session based on receiving the authentication information from the new user. In this way, a collaboration device may establish a collaboration session associated with a particular security level. Furthermore, the collaboration device may selectively provide information via the collaboration session, and may dynamically adjust the collaboration session (e.g., to provide different information, to adjust a security level, or the like).

Figure 2:
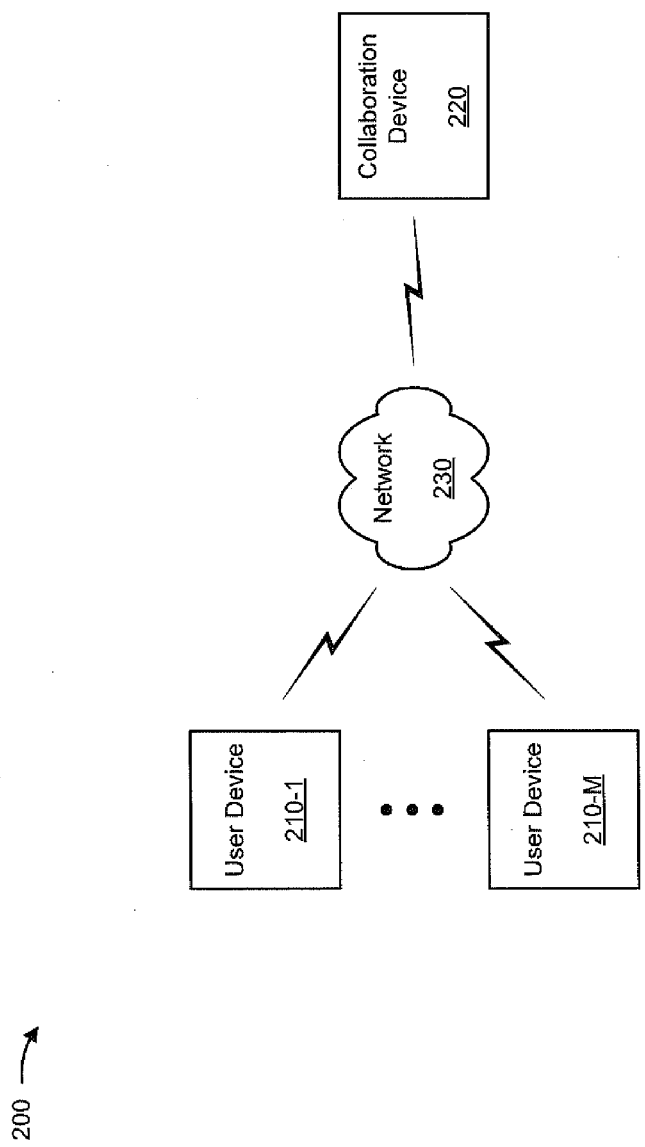
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include user devices 210-1 to 210-M (M≥1) (hereinafter referred to collectively as "user devices 210," and individually as "user device 210"), collaboration device 220, and network 230. Devices of environment 200 may interconnect via wired connections, wireless connections, or a combination of wired and wireless connections.

User device 210 may include one or more devices capable of receiving, generating, processing, storing, and/or providing information associated with a collaboration session. For example, user device 210 may include a mobile phone (e.g., a smart phone), a radiotelephone, a video phone, a personal communications systems (PCS) terminal (e.g., that may combine a cellular radiotelephone with data processing and data communications capabilities), a personal digital assistant (PDA) (e.g., that may include a radiotelephone, a pager, Internet/intranet access, etc.), a computer (e.g., a desktop computer, a laptop computer, a tablet computer, a wearable computer integrating audio feedback, visual feedback, haptic feedback, or the like, an augmented reality computer, etc.), a video game console, a set-top box, an interactive multimedia white board, a smart table, a smart board, or a similar type of device. In some implementations, user device 210 may include access to information regarding one or more users of user device 210, such as user identification information, user authentication information, or the like.

Collaboration device 220 may include one or more devices capable of receiving, generating, processing, storing, and/or providing information associated with managing a collaboration session. For example, collaboration device 220 may include a server device capable of hosting the collaboration session, authenticating one or more user devices 210 associated with the collaboration session, determining a trust-score associated with the collaboration session, performing adjustments to the collaboration session, or the like.

Network 230 may include one or more wired and/or wireless networks. For example, network 230 may include a cellular network (e.g., a long term evolution (LTE) network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), an ad hoc network, a Bluetooth network, a ZigBee network, a Z-Wave network, an intranet, the Internet, a fiber optic-based network, and/or a combination of these or other types of networks.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. For example, while user device 210 and collaboration device 220 are shown as separate devices, user device 210 and collaboration device 220 may be implemented in a single device or in a single collection of devices. Additionally, one or more of the devices of environment 200 may perform one or more functions described as being performed by another one or more devices of environment 200.

Figure 3:
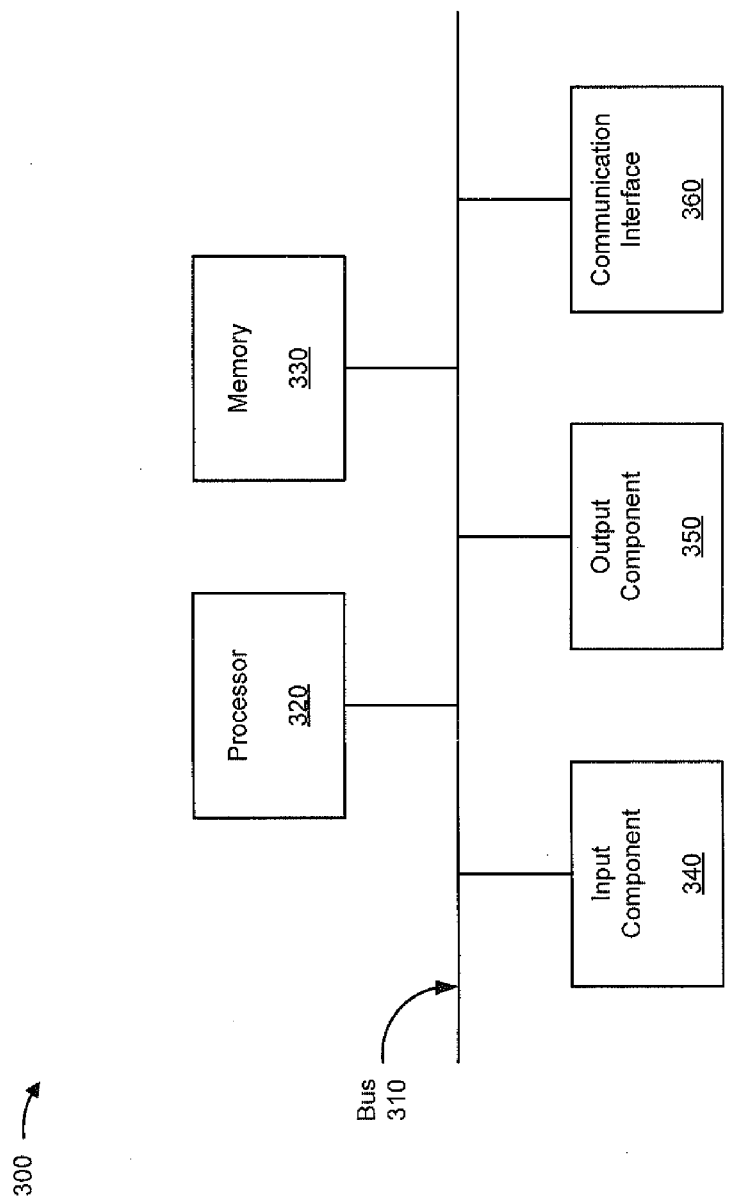
FIG. 3 is a diagram of example components of one or more devices of FIG. 2.

FIG. 3 is a diagram of example components of a device 300. Device 300 may correspond to user device 210 and/or collaboration device 220. In some implementations, each of user device 210 and/or collaboration device 220 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, a microphone, a camera, etc.). Output component 350 may include a component that outputs information from device 300 (e.g., a display, a speaker, one or more light-emitting diodes (LEDs), haptic output, etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a Wi-Fi interface, a cellular network interface, a High-Definition Multimedia Interface (HDMI), or the like.

Device 300 may perform one or more processes described herein. Device 300 may perform these processes in response to processor 320 executing software instructions included in a computer-readable medium, such as memory 330. A computer-readable medium is defined herein as a non-transitory memory device. A memory device includes memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3.

Figure 4:
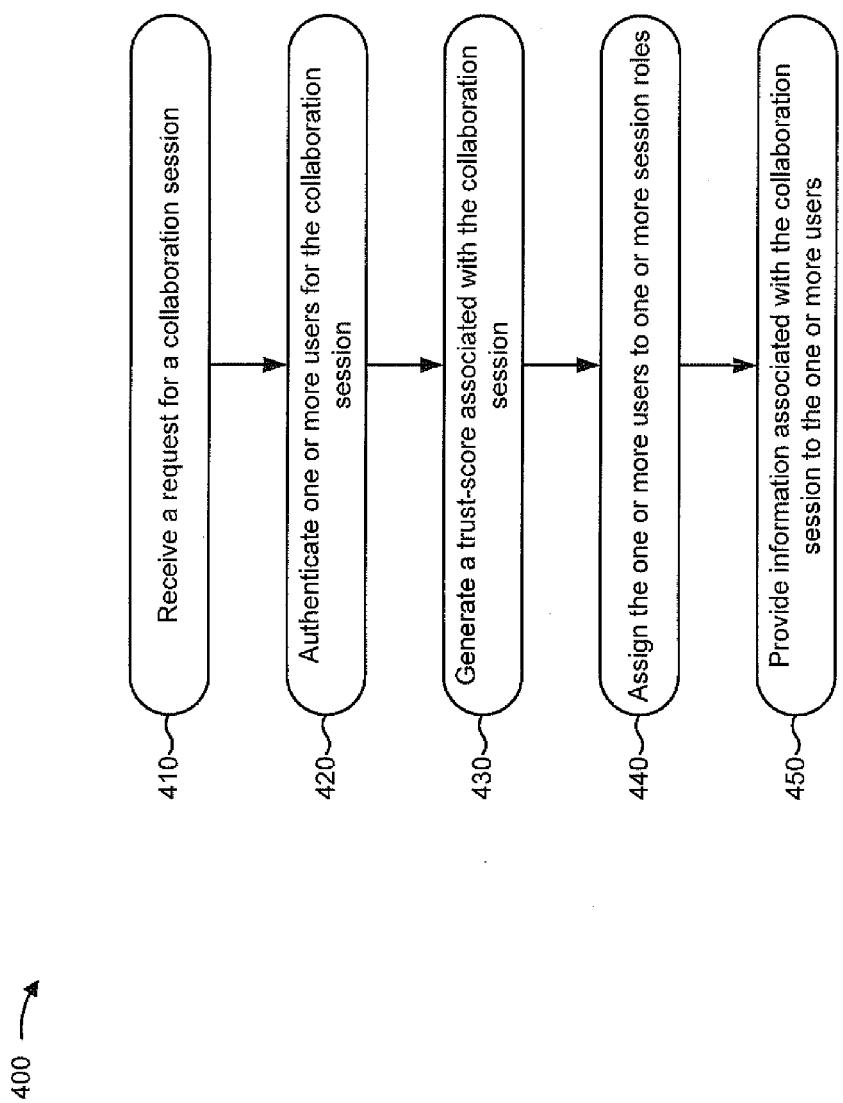
FIG. 4 is a flow chart of an example process for providing access to a secure multimedia collaboration session.

FIG. 4 is a flow chart of an example process for providing access to a secure multimedia collaboration session. In some implementations, one or more process blocks of FIG. 4 may be performed by collaboration device 220. Additionally, or alternatively, one or more process blocks of FIG. 4 may be performed by another device or a group of devices separate from or including collaboration device 220, such as user device 210 or the like.

As shown in FIG. 4, process 400 may include receiving a request for a collaboration session (block 410). For example, collaboration device 220 may receive the request for the collaboration session from user device 210. A collaboration session (e.g., a multimedia collaboration session) may refer to a set of communications between a set of user devices 210 that may include an audio portion, a video portion, a collaboration portion, or the like. For example, a particular collaboration session may facilitate multiple users editing a particular document, discussing the particular document, etc. In some implementations, collaboration device 220 may receive information requesting that the collaboration session be established. For example, user device 210 may provide information associated with establishing a new collaboration session. Additionally, or alternatively, collaboration device 220 may receive information requesting that user device 210 be connected to an existing collaboration session. For example, user device 210 may provide information identifying a particular collaboration session to which collaboration device 220 is to provide access.

As further shown in FIG. 4, process 400 may include authenticating one or more users for the collaboration session (block 420). For example, collaboration device 220 may authenticate one or more users (e.g., associated with user device 210) for the collaboration session. In some implementations, collaboration device 220 may authenticate the one or more users based on receiving a set of credentials associated with the one or more users, such as a set of user identifiers, a set of user passwords, or the like. Additionally, or alternatively, collaboration device 220 may authenticate the one or more users based on a biometric authentication (e.g., a fingerprint identification, a facial recognition identification, a retinal identification, etc.), a multi-factor authentication (e.g., an authentication including multiple identifications), or the like.

In some implementations, collaboration device 220 may request authentication information from the one or more users. For example, when multiple users are utilizing a particular user device 210 (e.g., an interactive multimedia whiteboard device), and when the multiple users are associated with multiple other user devices 210 (e.g., a set of mobile phones), collaboration device 220 may detect the presence of the multiple other user devices 210 (e.g., via GPS information, Wi-Fi availability information, Bluetooth information, Near-Field Communications information, LTE radio information, camera information, sound information, etc.), and may request authentication via the multiple other user devices 210. In some implementations, collaboration device 220 may request vouch-for information when authenticating the one or more users. For example, collaboration device 220 may provide information requesting that a particular user vouch-for authentication of another user.

In some implementations, collaboration device 220 may authenticate the one or more users based on performing a network session analysis for user device 210. For example, collaboration device 220 may access network information (e.g., a network type, an IP address, a port address, etc.), session information (e.g., a network protocol, a network trace-route, etc.), or the like, and may determine that a network connection to user device 210 satisfies a security threshold. In this case, collaboration device 210 may authenticate the one or more users based on the network connection to user device 210 satisfying the security threshold.

As further shown in FIG. 4, process 400 may include generating a trust-score associated with the collaboration session (block 430). For example, collaboration device 220 may generate the trust-score associated with the collaboration session. A trust-score may refer to an assessment (e.g., a quantification) of a set of trust-score factors associated with a particular collaboration session, a particular user, a particular user device 210, etc. For example, a particular trust-score may include a weighted calculation of one or more trust-score factors, such as an authentication factor associated with a user, an identification factor associated with user device 210, a network information factor, an environmental factor, or the like. The trust-score may correspond to a particular security level, such as an unclassified security level, a classified security level, a secret security level, a confidential security level, a top secret security level, or the like. A security level may be associated with one or more collaboration session capabilities, one or more documents, on or more sections of a particular document, etc. that may be provided via the collaboration session, or the like. For example, collaboration device 220 may utilize a particular security level that permits displaying a particular set of documents based on the trust-score satisfying a security level threshold.

In some implementations, collaboration device 220 may generate the trust-score based on determining one or more trust-score factors. For example, collaboration device 220 may utilize a user information factor, such as a user mobility factor (e.g., whether the user is a mobile user or a static user), a user environment factor (e.g., whether the user is in a public place or in a private place, a location associated with the user, etc.), a user authentication factor (e.g., whether the user utilized a password, a biometric authentication, etc.), or the like. Additionally, or alternatively, collaboration device 220 may utilize a device factor, such as an identification factor (e.g., based on information identifying user device 210, such as an international mobile subscriber identity (IMSI), a media access control (MAC) address, or the like), a proximity factor (e.g., based on information identifying a proximity of user device 210 to other user devices 210), or the like. Additionally, or alternatively, collaboration device 210 may utilize a network factor, such as network connection factor (e.g., based on information identifying a network, a network address, a network protocol, etc.), a firewall factor, a network proximity factor (e.g., based on information identifying a quantity of nodes through which information is to pass between a first user device 210 and a second user device 210 accessing the collaboration session), or the like. In some implementations, a user may provide information associated with modifying a trust-score, a trust-score factor, or the like. For example, user device 210 may provide, to collaboration device 220, information certifying that a particular location is a secure location.

In some implementations, collaboration device 220 may generate the trust-score by applying a trust-score weight to the one or more trust-score factors. For example, collaboration device 220 may utilize a weighting technique, such as based on a machine learning technique, a pattern recognition technique, a heuristic technique, or the like, to determine a set of weights for combining multiple trust-score factors. In some implementations, collaboration device 220 may monitor a user, a particular user device 210, a network, etc. to determine that a trust-score factor has changed, and may re-calculate a trust-score thereupon, as described herein with respect to FIG. 7.

In some implementations, collaboration device 220 may determine a particular trust-score for a particular user when generating the trust-score. For example, collaboration device 220 may determine the particular trust-score for the user based on a set of trust-score factors. Additionally, or alternatively, collaboration device 220 may determine a particular trust-score, for a particular user device 210, for one or more users associated with the particular user device 210, for a set of user devices 210 associated with the collaboration session, for an environment associated with user device 210, for a network associated with user device 210, or the like. For example, collaboration device 220 may determine a first trust-score for first user device 210, and may determine a second trust-score for second user device 210. In some implementations, collaboration device 220 may combine multiple trust-scores when generating the trust-score for the collaboration session. For example, collaboration device 220 may generate the trust-score for the collaboration session based on combining a first trust-score for first user device 210 and a second trust-score for second user device 210, such as by determining a mean trust-score, a minimum trust-score, or the like.

In some implementations, collaboration device 220 may select a security level when generating the trust-score for the collaboration session. For example, collaboration device 220 may determine that a trust-score satisfies a classified security level trust-score threshold, and may select the classified security level for the collaboration session. Additionally, or alternatively, collaboration device 220 may provide information identifying a set of security levels associated with the trust-score, and may receive a user selection of a particular security level of the set of security levels that is to be utilized.

In some implementations, collaboration device 220 may establish a particular collaboration session when generating the trust-score. For example, when user device 210 provides a request for access to a new collaboration session and collaboration device 220 determines a particular security level based on the trust-score, collaboration device 220 may establish the new collaboration session utilizing the particular security level. Additionally, or alternatively, when user device 210 provides a request for access to an existing collaboration session, and when collaboration device 220 determines a particular security level based on the trust-score, collaboration device 220 may re-configure the existing collaboration session to utilize the particular security level.

As further shown in FIG. 4, process 400 may include assigning the one or more users to one or more session roles (block 440). For example, collaboration device 220 may assign the one or more users to the one or more session roles. A session role may refer to a user associated with a particular set of collaboration session capabilities. For example, a user that is assigned a presenter session role (e.g., a presenter) may select information to be provided via the collaboration session, such as a presentation slide, a figure, a text, a website, a video, or the like. Additionally, or alternatively, another user that is assigned a participant session role (e.g., a participant) may be provided the information selected by the presenter. Additionally, or alternatively, another user that is assigned a moderator session role (e.g., a moderator), may select users that are to join the collaboration session. Additionally, or alternatively, other session roles may be associated with particular screen-views of the collaboration session, such as a super viewer session role (e.g., associated with displaying first information via the collaboration session), an ordinary viewer session role (e.g. associated with displaying second information via the collaboration session), or the like.

In some implementations, collaboration device 220 may assign a particular user to a particular session role based on a user request. For example, a user may request to be assigned a moderator session role, and collaboration device 220 may assign the user to the moderator session role. Additionally, or alternatively, collaboration device 220 may assign the particular user to the particular session role based on authentication information associated with the particular user. For example, collaboration device 220 may receive authentication information (e.g., a username, a password, etc.) indicating that the particular user is to be assigned the particular session role. Additionally, or alternatively, collaboration device 220 may assign the particular user to the particular session role based on identifying capabilities associated with user device 210. For example, a particular capability (e.g., an audio conferencing capability) may correspond to the particular session role. Additionally, or alternatively, collaboration device 220 may assign the particular user to the particular session role based on determining a particular trust-score. For example, collaboration device 220 may determine the particular trust-score associated with the particular user, and may assign the particular user to the particular session role based on the particular trust-score satisfying a threshold.

In some implementations, collaboration device 220 may request additional authentication information associated with assigning a particular user to a particular session role. For example, collaboration device 220 may request that the particular user provide a password associated with the particular session role, and may assign the particular user to the particular session role based on receiving the password from the particular user. In some implementations, collaboration device 220 may provide information identifying a particular session role when assigning a particular user to the particular session role.

As further shown in FIG. 4, process 400 may include providing information associated with the collaboration session to the one or more users (block 450). For example, collaboration device 220 may provide information associated with the collaboration session to the one or more users via user device 210. In some implementations, collaboration device 220 may provide connection information associated with the collaboration session. For example, collaboration device 220 may provide information associated with connecting user device 210 to the collaboration session (e.g., a newly established collaboration session, an existing collaboration session, or the like, that utilizes a particular security level determined based on the trust-score). Additionally, or alternatively, collaboration device 220 may provide information identifying the one or more users. For example, when collaboration device 220 provides information connecting user device 210 to the collaboration session, collaboration device 220 may provide information identifying the one or more users associated with user device 210 to one or more other user devices 210 connected to the collaboration session. Additionally, or alternatively, collaboration device 220 may provide configuration information associated with displaying the collaboration session. For example, collaboration device may determine a display-size associated with user device 210, and may provide information associated with scaling the collaboration session.

In some implementations, collaboration device 220 may provide information regarding the collaboration session to the one or more users. For example, collaboration device 220 may provide information identifying a trust-score, a security level, or the like, associated with the collaboration session. Additionally, or alternatively, collaboration device 220 may provide information identifying a set of collaboration session capabilities. For example, collaboration device 220 may provide information identifying one or more collaboration session capabilities available to a particular user, such as a voice command capability, a gesture command capability, a drawing capability, a presentation slide displaying capability, or the like (e.g., determined based on a session role, a trust-score, accessing a collaboration session capability data structure, etc.).

In some implementations, collaboration device 220 may provide the information associated with the collaboration session via the collaboration session. For example, collaboration device 220 may provide a set of presentation slides, a set of shared documents, audio information and/or video information, or the like via the collaboration session.

In some implementations, collaboration device 220 may provide information associated with dynamic adjustment of the collaboration session. For example, collaboration device 220 may provide information indicating adjustments that are to be monitored by user device 210, such as adjustments to an environment (e.g., a new user entering the environment, a new user device 210 entering the environment, etc.), a network (e.g., a new network protocol being used, a new network connection being used, etc.), or the like, as described herein with respect to FIG. 7.

In this way, a collaboration device may utilize a trust-score determination when providing access to a secure multimedia collaboration session.

Although FIG. 4 shows example blocks of process 400, in some implementations, process 400 may include additional blocks, different blocks, fewer blocks, or differently arranged blocks than those depicted in FIG. 4. Additionally, or alternatively, two or more of the blocks of process 400 may be performed in parallel.

FIG. 5 is a diagram of an example data structure 500 that stores collaboration session capability information associated with a collaboration session (e.g., a secure multimedia collaboration session). Data structure 500 may be stored in a memory device (e.g., a RAM, a hard disk, etc.) associated with one or more devices and/or components of FIG. 2 and/or FIG. 3. For example, data structure 700 may be stored by user device 210 and/or collaboration device 220

As shown in FIG. 5, data structure 500 may include a collection of fields, such as a context field 510 and a set of capability fields 520 (e.g., a whiteboard capability field, a display capability field, a keyboard capability field, a camera capability field, a voice input/output (I/O) capability field, a gesture I/O capability field, etc.).

Context field 510 may store an identifier, which identifies a particular collaboration context associated with user device 210, using a string of characters, such as letters, numbers, and/or symbols. A collaboration context may refer to a set of properties describing a particular collaboration session (e.g., a type of user device 210, an environment associated with user device 210, etc.). For example, a collaboration context may include information associated with security of a location in which user device 210 is being utilized, device information associated with user device 210 (e.g., information identifying a device type for user device 210), or the like.

The set of capability fields 520 may store information, which identifies a set of collaboration session capabilities that are to be utilized by user device 210, using a string of characters, such as an identifier, a binary indicator (e.g., "X"), or the like. For example, the set of context fields 520 may indicate whether user device 210 is permitted to utilize a multimedia whiteboard environment for the collaboration session (e.g., "Whiteboard"), a display capability (e.g., "Display"), a keyboard input capability (e.g., "Keyboard"), a video capability (e.g., "Camera"), a voice control capability (e.g., "Voice I/O"), and a gesture command capability (e.g., "Gesture I/O").

In some implementations, a particular set of features that are to be provided may be conceptually represented as a row of capability fields 520 associated with a particular context field 510. For example, when the context field 510 indicates collaboration context "2" (e.g., a collaboration context associated with an insecure classroom in which a collaborative multimedia whiteboard user device 210 is connected to a collaboration session), the set of capability fields 520 may indicate that user device 210 is permitted to utilize a multimedia whiteboard environment capability for the collaboration session, user device 210 is permitted to utilize a display for displaying the collaboration session, user device 210 is permitted to utilize a keyboard for receiving input associated with the collaboration session, user device 210 is permitted to utilize a camera to provide a video-conferencing capability and/or a gesture command capability, user device 210 is permitted to utilize a microphone and/or a speaker to provide an audio-conferencing capability and/or a voice command capability, and user device 210 is not permitted to utilize a gesture capability for providing information.

Data structure 500 includes fields 510 and 520 for explanatory purposes. In practice, data structure 500 may include additional fields, fewer fields, different fields, or differently arranged fields than those shown in FIG. 5 and/or described herein with respect to data structure 500. Furthermore, while data structure 500 is represented as a table with rows and columns, in practice data structure 500 may include any type of data structure, such as another type of table, a linked list, a tree, a hash table, a database, or any other type of data structure. In some implementations, data structure 500 may include information generated by a device and/or a component. Additionally, or alternatively, data structure 500 may include information provided from another source, such as information provided by a user and/or information automatically provided by a device.

Figure 6A:
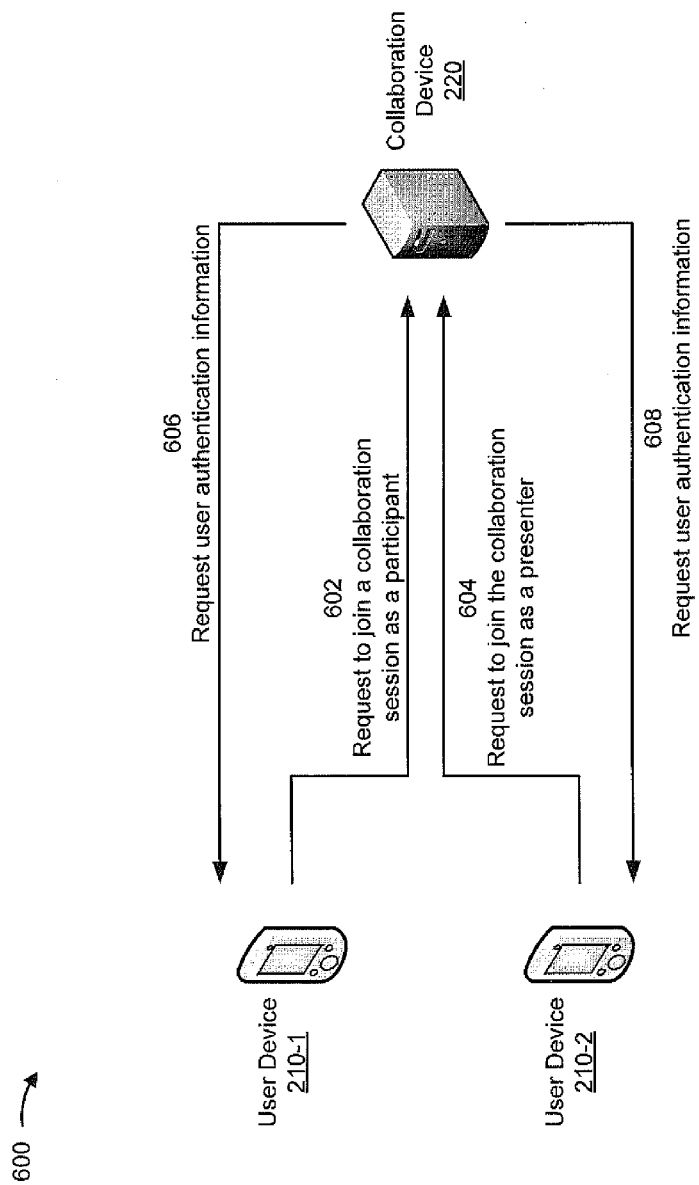
FIGS. 6A-6E are diagrams of an example implementation relating to the example process shown in FIG. 4.

FIGS. 6A-6E are diagrams of an example implementation 600 relating to process 400 shown in FIG. 4. As shown in FIG. 6A, example implementation 600 includes user device 210-1, user device 210-2, and collaboration device 220. As shown by reference number 602, user device 210-1 requests to join a collaboration session as a participant (e.g., a particular session role). As shown by reference number 604, user device 210-2 requests to join the collaboration session as a presenter (e.g., another particular session role). As shown by reference number 606, collaboration device 220 requests user authentication information from user device 210-1. As shown by reference number 608, collaboration device 220 requests user authentication information from user device 210-2.

Figure 6B:
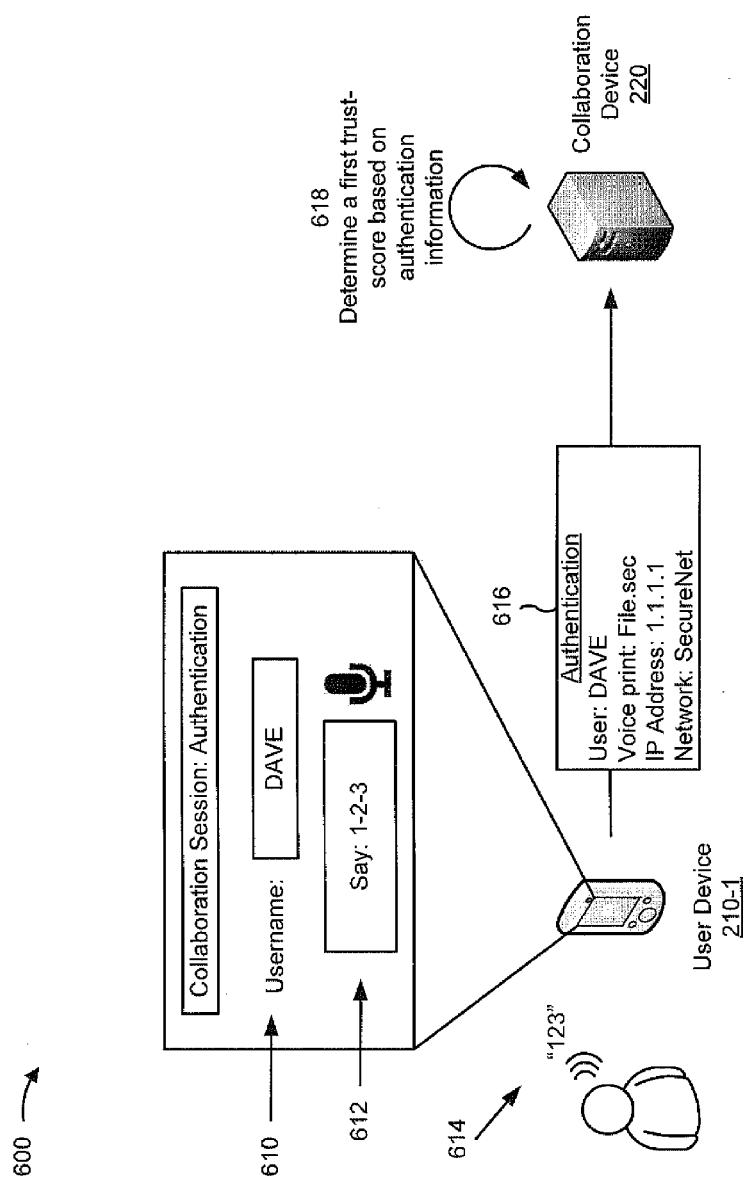

As shown in FIG. 6B, user device 210-1 displays a user interface with which to provide the authentication information. As shown by reference number 610, a user associated with user device 210-1 provides a username (e.g., "DAVE"). As shown by reference number 612, user device 210-1 requests a voiceprint identification from user Dave (e.g., "Say: 1-2-3"). As shown by reference number 614, user Dave provides the voice print identification to user device 210-1. As shown by reference number 616, user device 210-1 provides the authentication information including the username, the voice print identification (e.g., "File.sec"), and network information to collaboration device 220. As shown by reference number 618, collaboration device 220 determines a first trust-score based on the authentication information. Assume that collaboration device 220 determines a second trust-score based on other authentication information provided by user device 210-2.

Figure 6C:
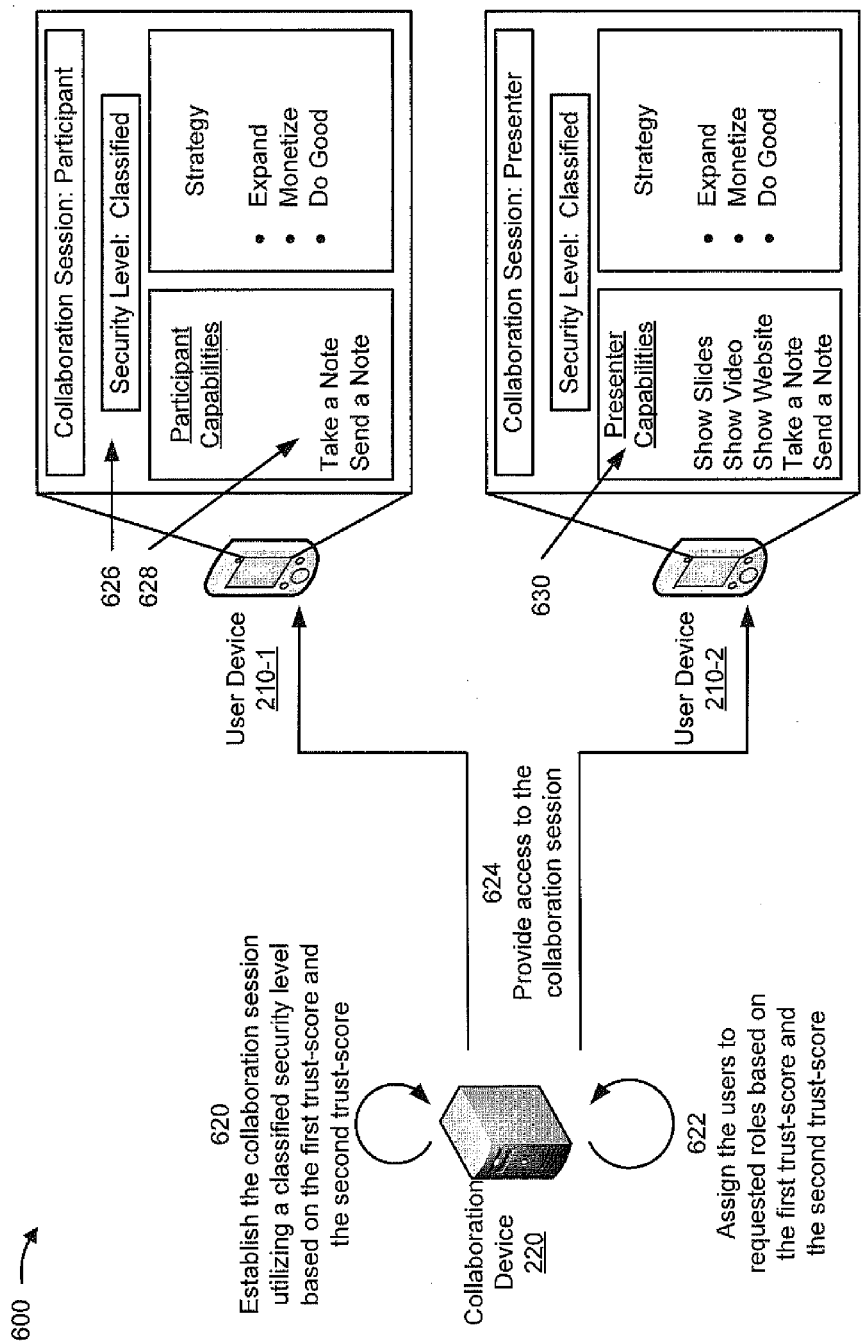

As shown in FIG. 6C, and by reference number 620, collaboration device 220 determines, based on the first trust-score and the second trust-score, to establish the requested collaboration session utilizing a classified security level. As shown by reference number 622, collaboration device 220 assigns the user of user device 210-1 to the participant role based on the first trust-score, and assigns a user of user device 210-2 to the presenter role based on the second trust-score. As shown by reference number 624, collaboration device 220 provides access to the collaboration session (e.g., by providing information associated with connecting to the collaboration session). As shown by reference number 626, user device 210-1 displays the security level of the collaboration session (e.g., "Security Level: Classified"). As shown by reference number 628, user device 210-1 displays a set of participant capabilities (e.g., collaboration session capabilities available to the user of user device 210-1), such as a "Take a Note" capability and a "Send a Note" capability. As shown by reference number 630, user device 210-2 displays a set of presenter capabilities (e.g., "Show Slides," "Show Video," "Show Website," "Take a Note," and "Send a Note").

Figure 6D:
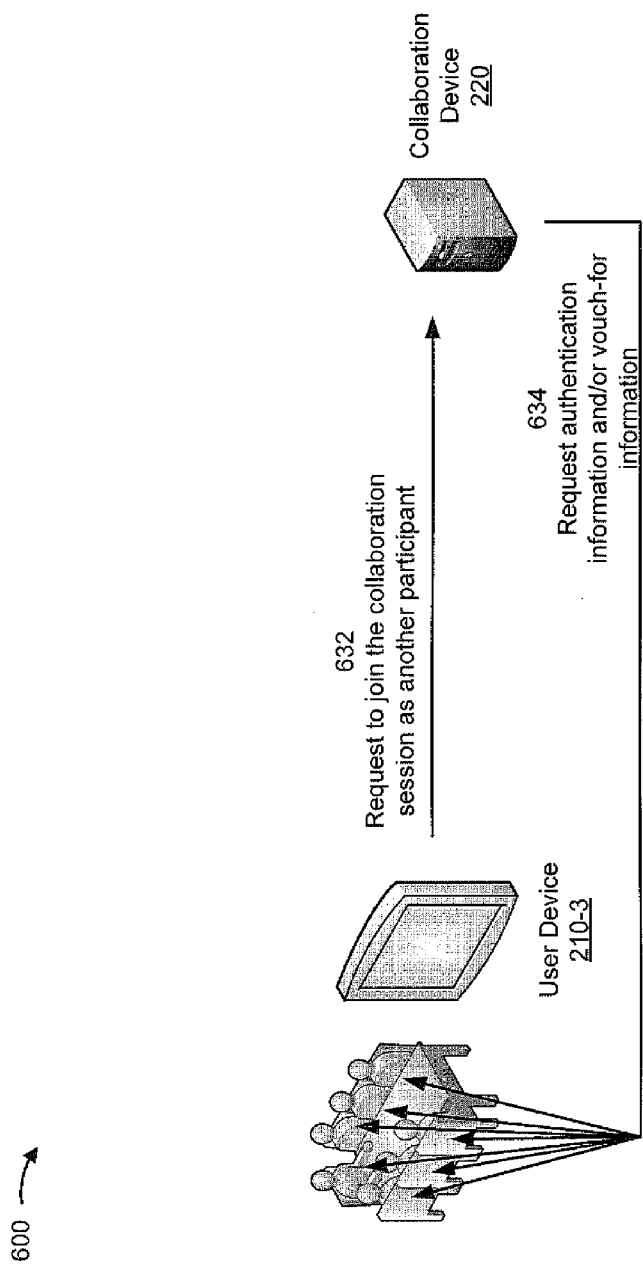

As shown in FIG. 6D, and by reference number 632, user device 210-3 provides, for a set of users, a request to join the collaboration session as another participant. As shown by reference number 634, collaboration device 220 requests authentication information and/or vouch-for information from the set of users. Assume that the set of users provide the authentication information and/or the vouch-for information, and that collaboration device 220 determines a third trust-score for the set of users (e.g., based on a mean trust-score, a minimum trust-score, a median trust-score, etc.).

Figure 6E:
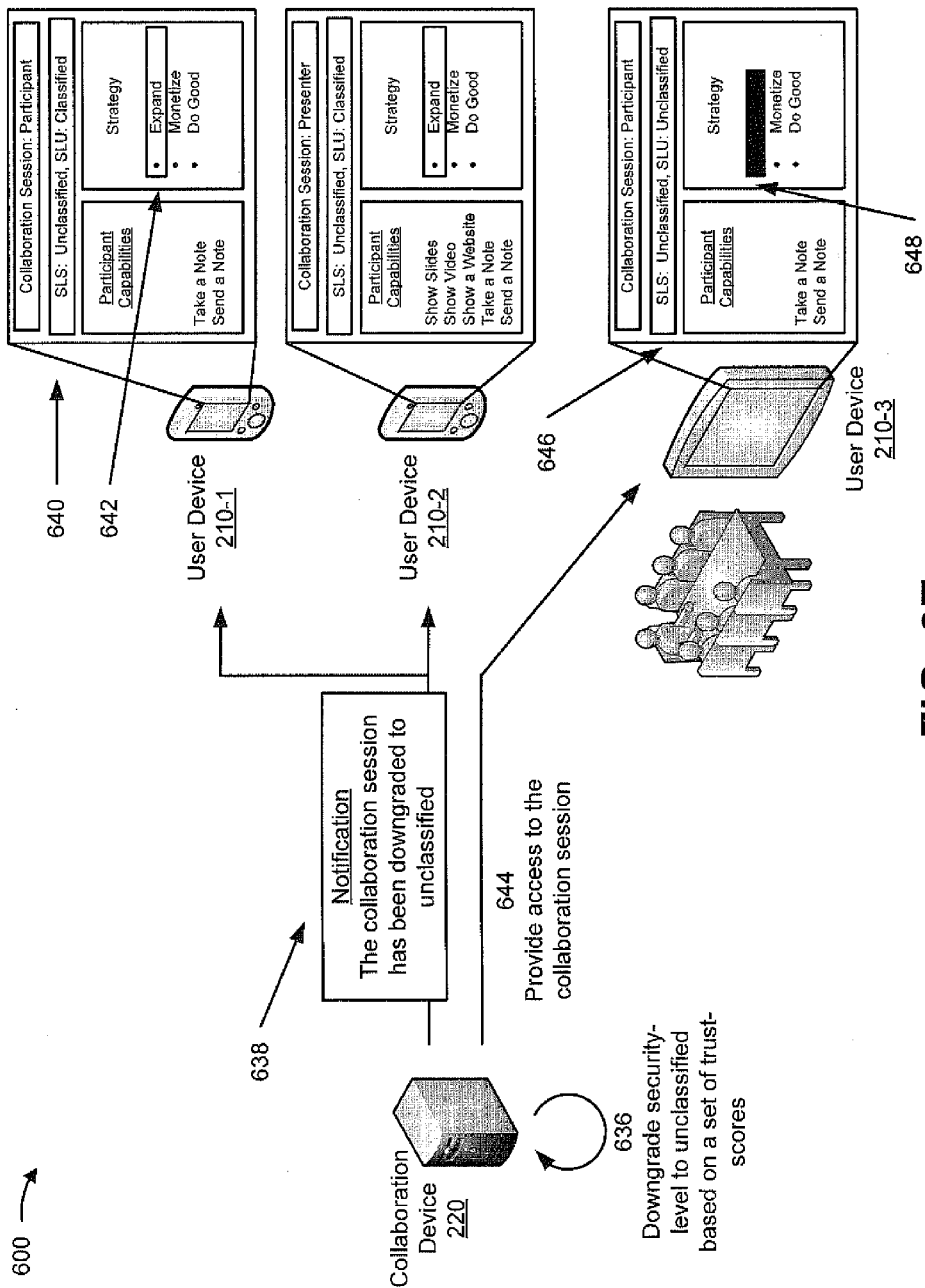

As shown in FIG. 6E, and by reference number 636, assume that collaboration device 220 downgrades the security level of the collaboration session to an unclassified security level based on the third trust-score. Assume that collaboration device 220 accesses stored information indicating a set of redactions to be performed when the unclassified security level is utilized. As shown by reference number 638, collaboration device 220 provides, to user device 210-1 and user device 210-2, a notification that the collaboration session has been downgraded to the unclassified security level. As shown by reference number 640, user device 210-1 displays, via the collaboration session, information identifying the security level for the collaboration session (e.g., "SLS: Unclassified") and a security level associated with the user of user device 210-1 (e.g., "SLU: Classified"). As shown by reference number 642, user device 210-1 provides, via the collaboration session, an indication of information that is to be redacted for user device 210-3 based on the collaboration session being downgraded to the unclassified security level.

As shown by reference number 644, collaboration device 220 provides access to the collaboration session for user device 210-3. As shown by reference number 646, user device 210-3 displays, via the collaboration session, information identifying the security level for the collaboration session (e.g., "SLS: Unclassified") and information identifying the security level for the set of users associated with user device 210-3 (e.g., "SLU: Unclassified"). As shown by reference number 648, information that is not to be provided to the set of users associated with user device 210-3, based on the security level associated with the set of users, is redacted.

As indicated above, FIGS. 6A-6E are provided merely as an example. Other examples are possible and may differ from what was described with regard to FIGS. 6A-6E.

Figure 7:
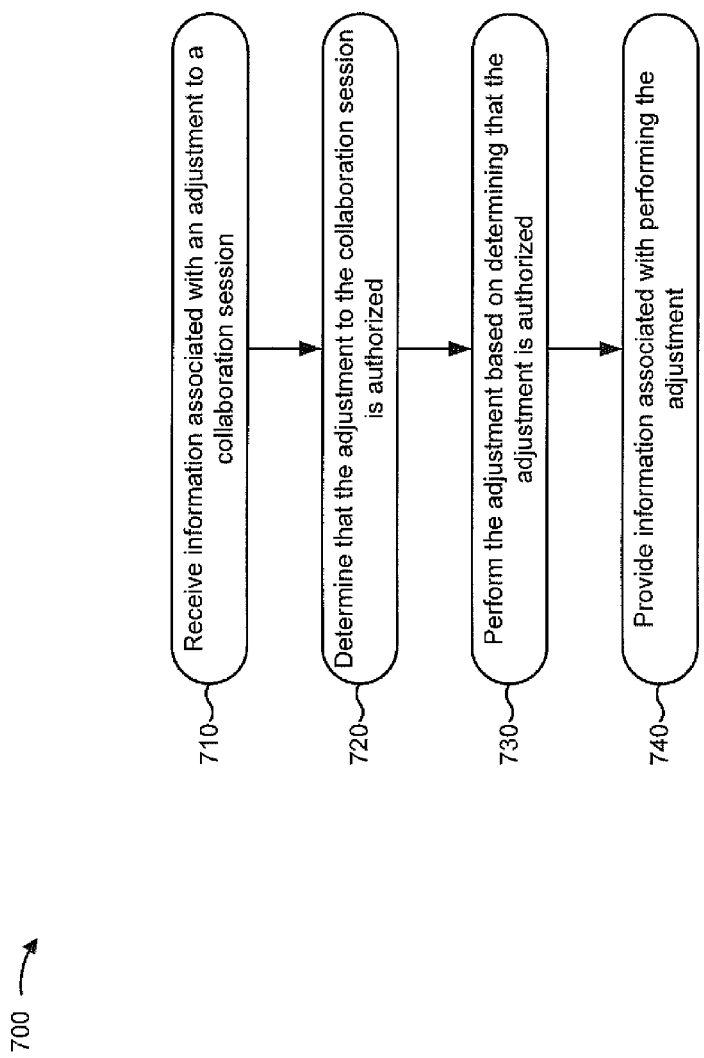
FIG. 7 is a flow chart of an example process for adjusting a secure multimedia collaboration session.

FIG. 7 is a flow chart of an example process for adjusting a secure multimedia collaboration session. In some implementations, one or more process blocks of FIG. 7 may be performed by collaboration device 220. Additionally, or alternatively, one or more process blocks of FIG. 7 may be performed by another device or a group of devices separate from or including collaboration device 220, such as user device 210 or the like.

As shown in FIG. 7, process 700 may include receiving information associated with an adjustment to a collaboration session (block 710). For example, collaboration device 220 may receive information requesting the adjustment to the collaboration session (e.g., a secure multimedia collaboration session) from user device 210. In some implementations, collaboration device 220 may receive information, such as a voice command, a gesture command, or the like, associated with indicating the adjustment. For example, collaboration device 220 may receive a first audio file from user device 210, and may determine that the first audio file contains a voice command (e.g., indicating the adjustment to the collaboration session).

In some implementations, collaboration device 220 may receive information triggering the adjustment when receiving information associated with the adjustment. For example, collaboration device 220 may receive information indicating a change to a trust-score factor, such as recognizing a new person in an environment associated with user device 210 (e.g., via facial recognition, via voice-print recognition, via user indication, etc.), a new device in the environment associated with user device 210, a new network path being associated with user device 210, or the like. In this case, collaboration device 220 may determine that a particular adjustment is to be made (e.g., recalculating a trust-score, re-selecting a security level, re-configuring the collaboration session, etc.). In some implementations, collaboration device 220 may receive the information triggering the adjustment based on monitoring a user, user device 210, a network, an environment, or the like. In some implementations, collaboration device 220 may continuously monitor, periodically monitor, or the like, for the information triggering the adjustment.

In some implementations, collaboration device 220 may identify the adjustment to the collaboration session when receiving the information associated with the adjustment. For example, collaboration device 220 may identify a visibility of information, a session slide, a security level, or the like, that is to be adjusted. Additionally, or alternatively, collaboration device 220 may identify a set of user devices 210 accessing the collaboration session that are to be provided an indication of the adjustment. For example, user device 210 may indicate to collaboration device 220 that a first adjustment (e.g., an annotation to a presentation slide) is to be made available for display via only user device 210, and may indicate that a second adjustment (e.g., another presentation slide that is to be provided) is to be made available for display via other user devices 210 accessing the collaboration session rather than the first adjustment.

As further shown in FIG. 7, process 700 may include determining that the adjustment to the collaboration session is authorized (block 720). For example, collaboration device 220 may determine that the user is authorized to request the adjustment to the collaboration session based on user authentication information associated with the user, a session role assigned to the user, a security level for the collaboration session, or the like. Additionally, or alternatively, collaboration device 220 may determine that the adjustment is authorized based on a security level associated with the collaboration session, based on a trust-score associated with the collaboration session, based on a particular screen-view being provided via the collaboration session or the like. For example, when the collaboration session is associated with a particular security level, and when a new user is detected in an environment associated with user device 210, collaboration device 220 may determine that re-calculating a trust-score for the collaboration session is authorized (e.g., based on accessing a data structure storing authorized adjustments).

As further shown in FIG. 7, process 700 may include performing the adjustment based on determining that the adjustment is authorized (block 730). For example, collaboration device 220 may perform the adjustment based on determining that the user is authorized to request the adjustment. Additionally, or alternatively, collaboration device 220 may perform the adjustment based on determining that the adjustment is pre-authorized (e.g., based on comparing the adjustment to a set of adjustments associated with a security level for the collaboration session or the like). For example, when collaboration device 220 receives an indication that a new user has entered an environment associated with user device 210, collaboration device 220 may re-calculate the trust-score associated with the collaboration session, may select a new security level for the collaboration session, and may re-configure the collaboration session based on the new security level. In some implementations, collaboration device 220 may remove user device 210 from the collaboration session when performing the adjustment. For example, when a trust-factor associated with a user of user device 210 changes, collaboration device 220 may remove user device 210 from the collaboration session to maintain a security level associated with the collaboration session. Additionally, or alternatively, collaboration device 220 may suspend the collaboration session, when performing the adjustment, based on the security level.

In some implementations, collaboration device 220 may perform the adjustment as indicated. For example, when the user draws a figure via the collaboration session, collaboration device 220 may adjust the collaboration session to provide the figure as drawn. Additionally, or alternatively, collaboration device 220 may perform a modified adjustment. For example, when the user draws another figure (e.g., a stick-figure) via the collaboration session, collaboration device 220 may recognize the figure, and may replace the figure with a modified figure (e.g. an image of a person approximated by the stick-figure). In this case, collaboration device 220 may recognize the adjustment based on machine learning technique, based on a pattern recognition technique, based on a heuristic technique, based on comparing the adjustment to a set of pre-determined adjustments, or the like). Additionally, or alternatively, collaboration device 220 may recognize and perform a modified adjustment based on receiving information indicating a shape, an object, a text, a writing, or the like.

As further shown in FIG. 7, process 700 may include providing information associated with performing the adjustment (block 740). For example, collaboration device 220 may provide, to user device 210, information associated with performing the adjustment. In some implementations, collaboration device 220 may update the collaboration session to show the adjustment when providing information associated with performing the adjustment. For example, collaboration device 220 may provide an indication of a different security level, provide a different presentation slide, provide a drawn figure for display, etc.

In some implementations, collaboration device 220 may provide information to user device 210, when providing information associated with performing the adjustment, associated with facilitating object resizing, object movement, object rotation, object property change (e.g., a color change, a thickness change, etc.), object content attribution (e.g., a tag identifying a user associated with the object), sticky-noting, or the like. In some implementations, collaboration device 220 may apply a timestamp when providing information associated with performing the adjustment, and may provide an indication of the timestamp. Additionally, or alternatively, collaboration device 220 may record the collaboration session, and may provide the recording to user device 210, to a storage device, etc. when providing information associated with performing the adjustment to generate a playback video for reviewing the adjustment, another set of adjustments, audio and/or video information displayed via the collaboration session, or the like.

Collaboration device 220 may provide information attributing the adjustment when providing information associated with performing the adjustment. For example, when a particular user draws a figure on a presentation slide, collaboration device 220 may provide a tag indicating the identity of the particular user (e.g., determined based on user device 210, based on facial recognition, based on voice recognition, or the like). Additionally, or alternatively, collaboration device 220 may provide information identifying a checkpoint associated with the adjustment. For example, collaboration device 220 may provide information indicating that user device 210 is to display a button with which to reverse the adjustment.

In this way, a collaboration device may dynamically adjust a multimedia collaboration session.

Although FIG. 7 shows example blocks of process 700, in some implementations, process 700 may include additional blocks, different blocks, fewer blocks, or differently arranged blocks than those depicted in FIG. 7. Additionally, or alternatively, two or more of the blocks of process 700 may be performed in parallel.

Figure 8A:
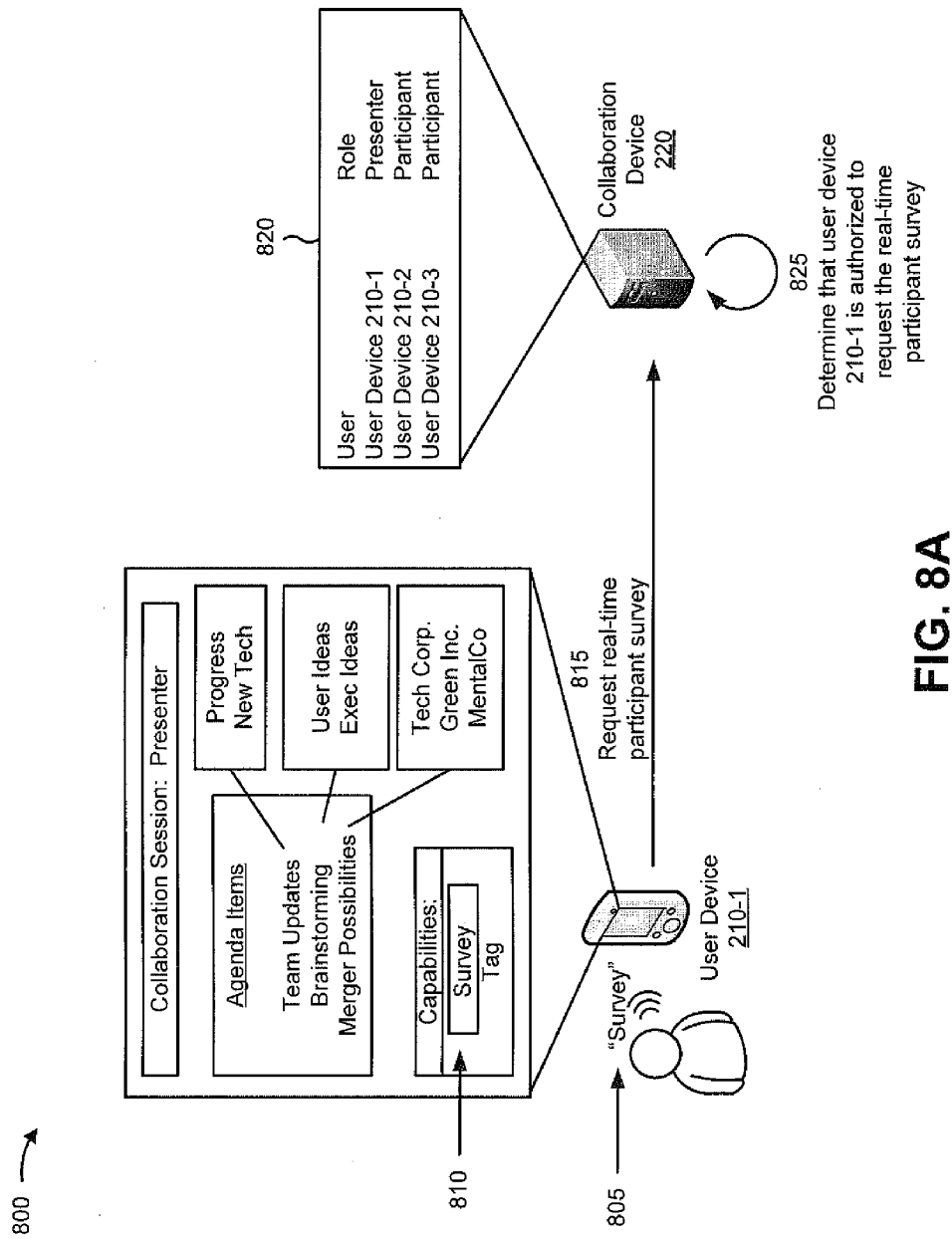
Figure 8C:
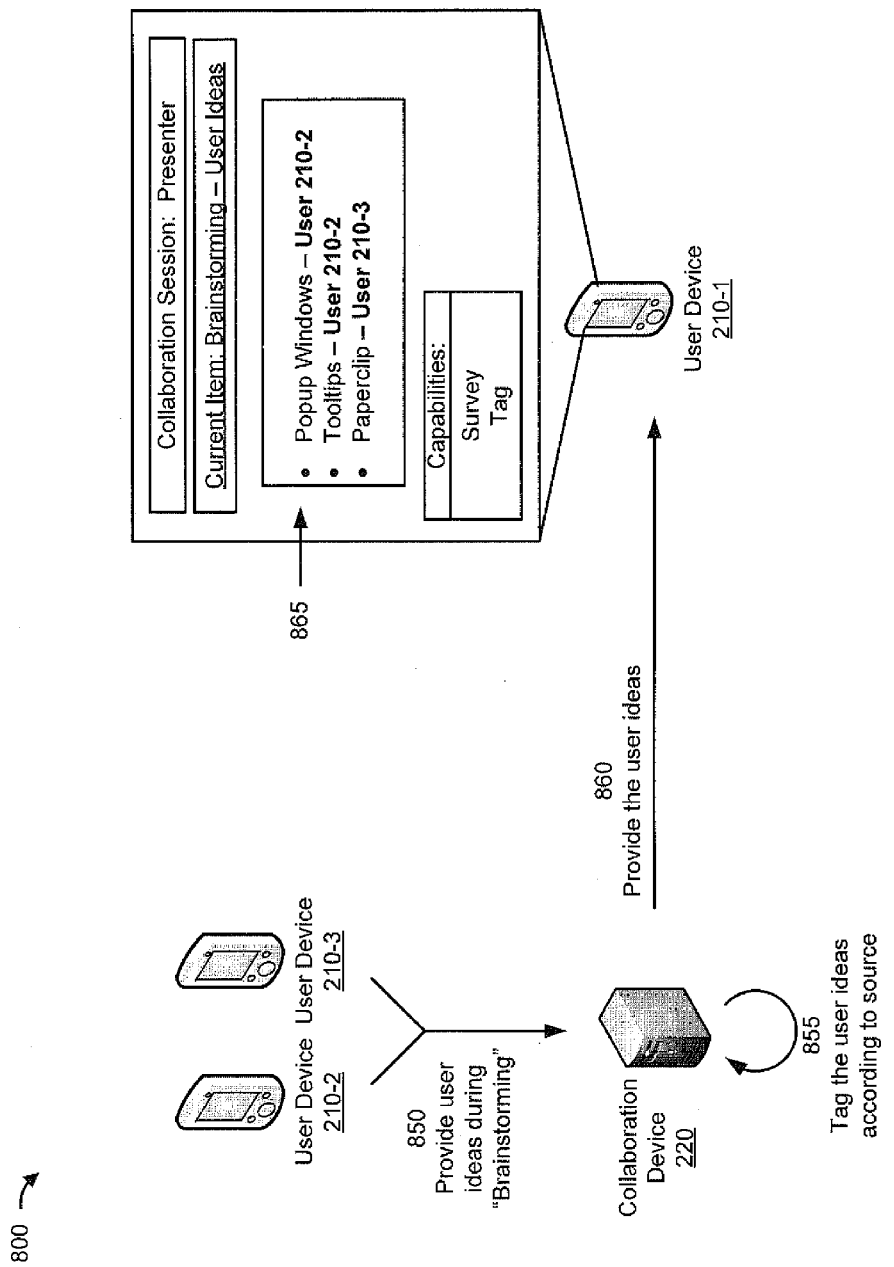

FIGS. 8A-8C are diagrams of an example implementation 800 relating to process 700 shown in FIG. 7. As shown in FIG. 8A, example implementation 800 includes user device 210-1 and collaboration device 220. As shown by reference number 805, a user of user device 210 speaks a voice command (e.g. "Survey"). As shown by reference number 810, user device 210 selects a survey capability, and as shown by reference number 815, requests an adjustment to the collaboration session (e.g., that the collaboration session provide a "real-time participant survey"). As shown by reference number 820, collaboration device 220 includes a data structure storing information identifying the session roles assigned to a set of user devices 210. Assume that a presenter is authorized to request a real-time participant survey. As shown by reference number 825, based on determining that user device 210-1 is associated with the presenter role, collaboration device 220 determines that user device 210-1 is authorized to request the real-time participant survey.

As shown in FIG. 8B, and by reference number 830, collaboration device 220 provides survey information via the collaboration session to user device 210-2. As shown by reference number 835, the collaboration session displays the participant survey (e.g., "Agenda Item Survey"), and the user performs a first ranking of a set of agenda items. As shown by reference number 840, and based on user interaction with a button, user device 210-2 records the first ranking, and as shown by reference number 845, provides the first ranking to collaboration device 220. Assume that collaboration device 220 receives a second ranking from user device 210-3. Assume that collaboration device 220 adjusts the collaboration session to facilitate discussing the top agenda item (e.g., "Brainstorming") based on the first ranking and the second ranking.

As shown in FIG. 8C, and by reference number 850, user device 210-2 and user device 210-3 provide user ideas during the "Brainstorming" agenda item. As shown by reference number 855, collaboration device 220 receives the user ideas, and collaboration device 220 tags the user ideas according to source (e.g., associates the user ideas with user device 210-2, user device 210-3, etc.). As shown by reference number 860, collaboration device 220 provides the tagged user ideas to user device 210-1 (e.g., via the collaboration session). As shown by reference number 865, user device 210-1 displays the tagged user ideas via the collaboration session for review.

As indicated above, FIGS. 8A-8C are provided merely as an example. Other examples are possible and may differ from what was described with regard to FIGS. 8A-8C.

Figure 9A:
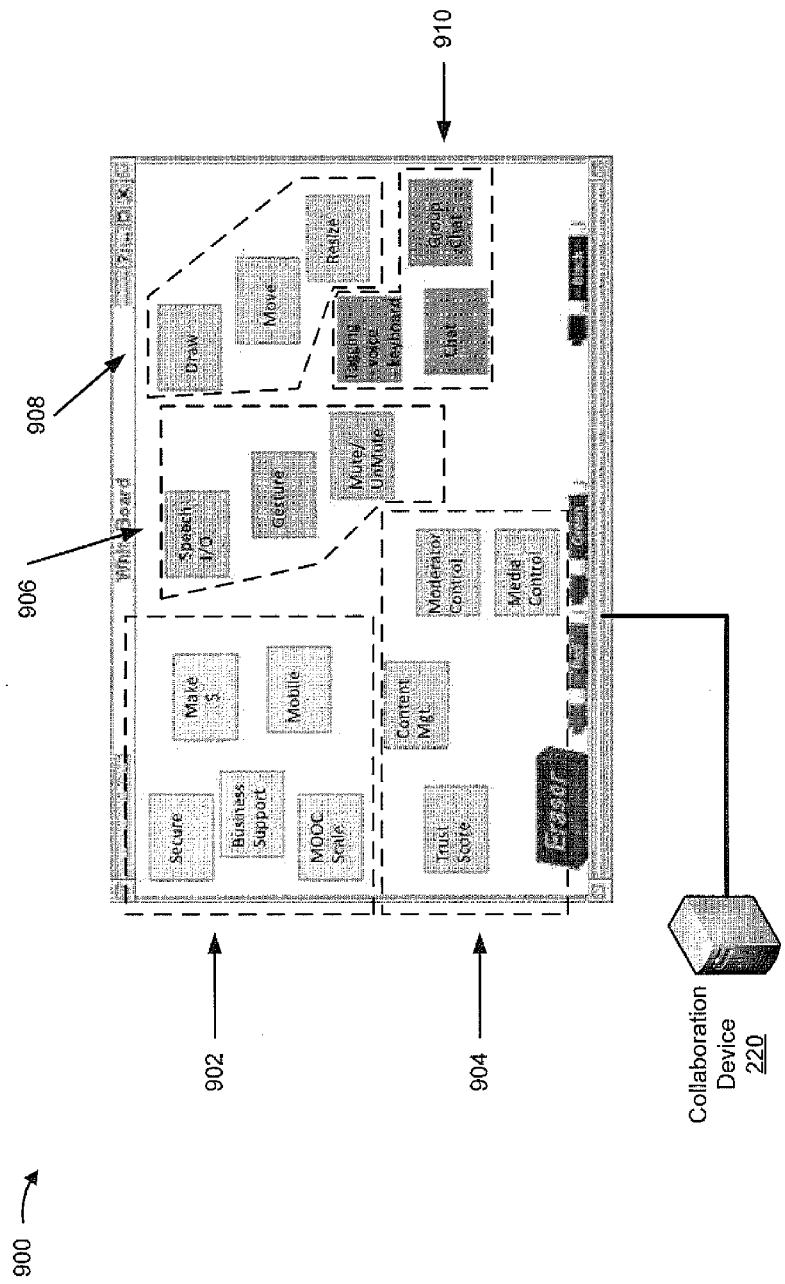
FIGS. 9A-9C are diagrams of another example implementation relating to the example process shown in FIG. 7.
Figure 9B:
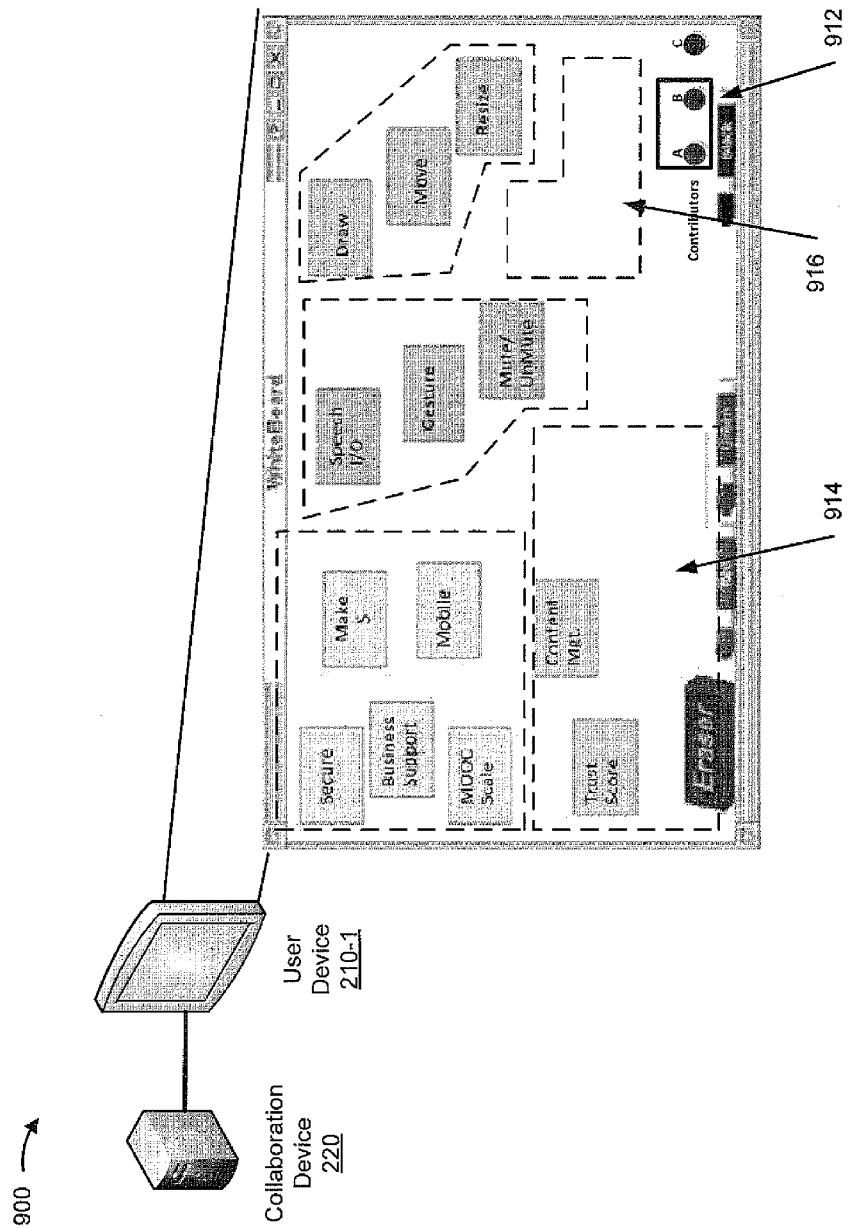
Figure 9C:
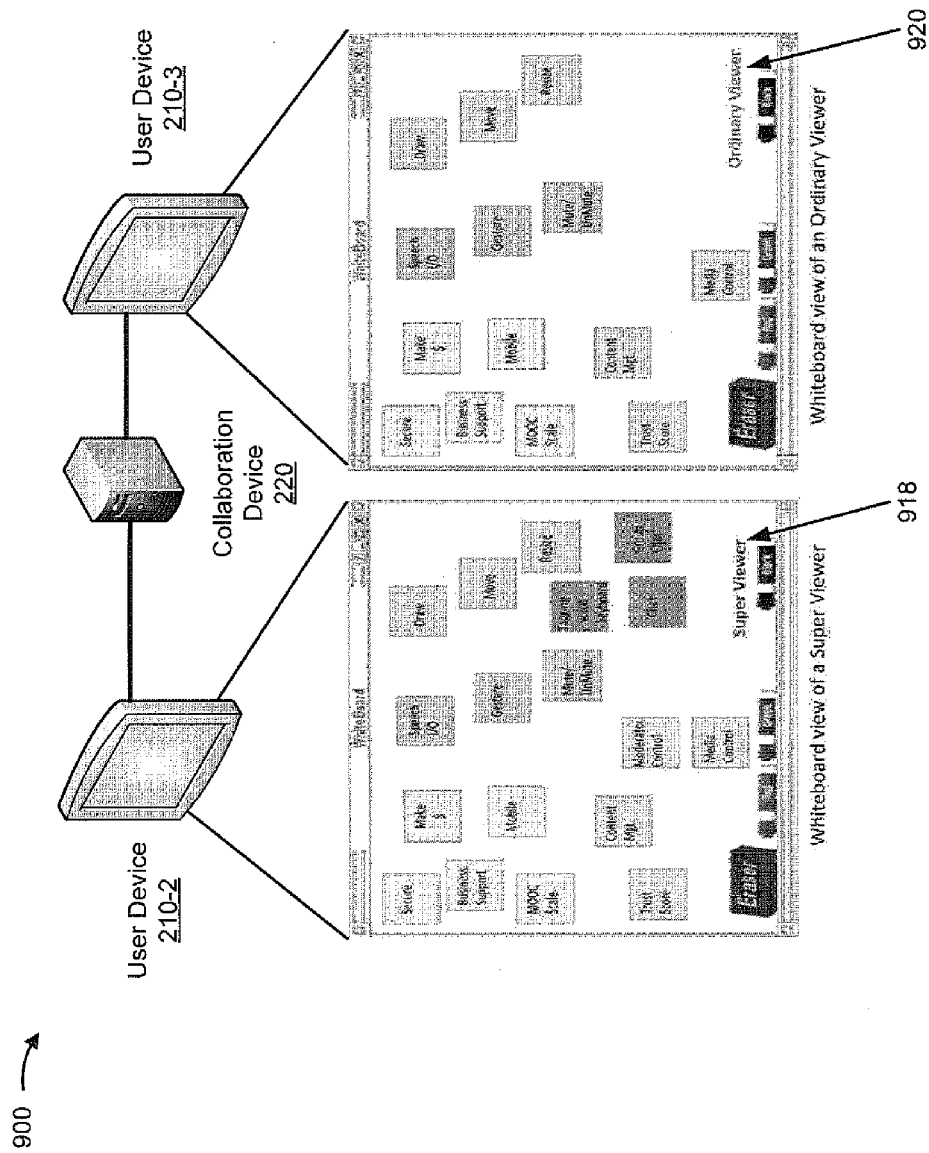

FIGS. 9A-9C are diagrams of an example implementation 900 relating to process 700 shown in FIG. 7. As shown in FIG. 9A, example implementation 900 includes collaboration device 220 providing multiple sets of items (e.g., agenda items, sticky notes, buttons for accessing capabilities, etc.) that may be accessed by a user of the collaboration session via an interactive multimedia whiteboard. As shown by reference number 902, a first set of items displayed via the collaboration session are associated with a first tag (e.g., indicating agenda items). As shown by reference number 904, a second set of items displayed via the collaboration session are associated with a second tag (e.g., indicating information associated with the collaboration session). As shown by reference number 906, a third set of items displayed via the collaboration session are associated with a third tag (e.g., indicating input/output capabilities). As shown by reference number 908, a fourth set of items displayed via the collaboration session are associated with a fourth tag (e.g. indicating display adjustment capabilities). As shown by reference number 910, a fifth set of items displayed via the collaboration session are associated with a fifth tag (e.g., indicating chat control capabilities).

As shown in FIG. 9B, and by reference number 912, the interactive multimedia whiteboard is provided via user device 210-1, and indicates that a first screen-view of the collaboration session is associated with displaying content attributed to particular users (e.g., contributors "A" and "B"). As shown by reference number 914, the first screen-view removes a particular subset of items included in the second set of items (e.g., a "Moderator Control" item and a "Media Control" item) that are not to be provided via user device 210-1. As shown by reference number 916, the first screen-view removes another particular subset of items included in the fifth set of items (e.g., a "Tagging-voice-keyboard" item, a "Chat" item, and a "Group Chat" item).

As shown in FIG. 9C, and by reference number 918, the interactive multimedia whiteboard is being provided via user device 210-2, and displays a second screen-view of the collaboration session associated with a particular session role (e.g., a "Super Viewer"). The second screen-view includes a set of items that may be selected by a user utilizing a super viewer session role, such as a "tagging-voice-keyboard" item, a "chat" item, a "group chat" item, a "moderator control" item, etc. As shown by reference number 920, the interactive whiteboard is provided via user device 210-3, and displays a third screen-view associated with another particular session role (e.g., an "Ordinary Viewer"). The third screen-view includes another set of items that may be selected by another user utilizing the ordinary viewer session role. The third screen-view does not include the "tagging-voice-keyboard" item, the "chat" item, the "group chat" item, and the "moderator control" item.

As indicated above, FIGS. 9A-9C are provided merely as an example. Other examples are possible and may differ from what was described with regard to FIGS. 9A-9C.

Implementations described herein may assist a collaboration device in providing a dynamically adjustable secure multimedia collaboration session.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in conjunction with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

To the extent the aforementioned implementations collect, store, or employ personal information provided by individuals, it should be understood that such information shall be used in accordance with all applicable laws concerning protection of personal information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, at least partially implemented in hardware and connected to the one or more memories, to:
   receive a first request for a collaboration session from a first user associated with a first user device;
   authenticate the first user for the collaboration session based on the first request;
   access information regarding a network associated with the first user device,
      the information regarding the network identifying one or more properties associated with the network;
   perform a network analysis on the information regarding the network;
   generate a first trust-score, associated with the collaboration session, based on authenticating the first user and based on the network analysis of the information regarding the network,
      the first trust-score being associated with a first security level for the collaboration session,
         the first security level being associated with one or more capabilities of the collaboration session;
   assign the first user to a session role, associated with the collaboration session, based on the first trust-score,
      the session role being associated with the one or more capabilities of the collaboration session,
      the one or more capabilities identifying one or more actions that the first user is permitted to take in association with the collaboration session;
   receive a second request for the collaboration session;
   authenticate a second user for the collaboration session based on the second request;
   generate a second trust-score, associated with the collaboration session, based on authenticating the second user,
      the second trust-score being associated with a second security level for the collaboration session,
         the second security level being associated with the one or more capabilities of the collaboration session,
         the second security level being different than the first security level;
   provide, to the first user device associated with the first user, first information associated with the collaboration session, based on the first security level for the collaboration session;
   provide, to a second user device associated with the second user, second information associated with the collaboration session, based on the second security level for the collaboration session,
      the second information being different than the first information based on the second security level being different than the first security level;
   monitor, during the collaboration session, the network to detect an adjustment to the one or more properties associated with the network;
   determine, during the collaboration session, a new first trust-score based on detecting the adjustment;
   change, during the collaboration session, the first security level for the collaboration session based on the new first trust-score; and
   reconfigure the collaboration session based on the change to the first security level.

2. The device of claim 1, where the one or more processors are further to:
   determine that the first request indicates that the collaboration session is to be established; and
   establish the collaboration session utilizing the first security level based on determining that the first request indicates that the collaboration session is to be established.

3. The device of claim 1, where the one or more processors are further to:
   receive information regarding an environment associated with the first user device;
   determine the first trust-score based on the information regarding the environment associated with the first user device;
   monitor the environment associated with the first user device to detect an adjustment to the environment; and
   change the first security level for the collaboration session based on detecting the adjustment to the environment.

4. The device of claim 1, where the one or more processors are further to:
   receive identification information associated with the first user; and
   generate the first trust-score based on the identification information associated with the first user.

5. The device of claim 1, where the one or more processors are further to:
   detect an adjustment to a trust-score factor associated with the first trust-score; and
   determine the new first trust-score based on detecting the adjustment to the trust-score factor.

6. The device of claim 1, where the one or more processors are further to:
   receive a request indicating the session role;
   determine that the first user is authorized to be assigned to the session role based on receiving the request indicating the session role; and
   assign the first user to the session role based on determining that the first user is authorized to be assigned to the session role.

7. A non-transitory computer-readable medium storing instructions, the instructions comprising:
   one or more instructions that, when executed by one or more processors, cause the one or more processors to:

receive a first request, from a first user associated with a first user device, to be connected to a multimedia collaboration session,
    the multimedia collaboration session being associated with a first security level;
authenticate the first user for the multimedia collaboration session based on the first request;
access information regarding a network associated with the first user device;
    the information regarding the network identifying one or more properties associated with the network;
perform a network analysis on the information regarding the network;
generate a first trust-score associated with the first user device based on authenticating the first user for the multimedia collaboration session and based on the network analysis of the information regarding the network;
selectively change a security level for the multimedia collaboration session based on the first trust-score and one or more second trust-scores associated with one or more second user devices,
    the one or more second user devices being connected to the multimedia collaboration session,
    the one or more second trust-scores being associated with a second security level for the multimedia collaboration session,
        the second security level being different than the first security level;
assign the first user device to a particular session role, associated with the multimedia collaboration session, based on the first trust-score;
provide, to the first user device, first information associated with the multimedia collaboration session, based on the first security level and the particular session role;
provide, to the one or more second user devices, second information associated with the multimedia collaboration session, based on the second security level for the multimedia collaboration session,
    the second information being different than the first information based on the second security level being different than the first security level;
monitor, during the multimedia collaboration session, the network to detect an adjustment to the one or more properties associated with the network;
determine, during the multimedia collaboration session, a new first trust-score based on detecting the adjustment;
change, during the multimedia collaboration session, the first security level for the multimedia collaboration session based on the new first trust-score; and
reconfigure the multimedia collaboration session based on the change to the first security level.

8. The non-transitory computer-readable medium of claim 7, where the one or more instructions, when executed by the one or more processors, further cause the one or more processors to:
receive a request for a particular adjustment to the multimedia collaboration session;
identify a set of adjustments associated with the particular session role,
    the set of adjustments associated with the particular session role including the particular adjustment;
determine that the particular adjustment is authorized based on the set of adjustments associated with the particular session role, including the particular adjustment;
perform the particular adjustment based on determining that the particular adjustment is authorized; and
provide information associated with performing the particular adjustment.

9. The non-transitory computer-readable medium of claim 7, where the one or more instructions, when executed by the one or more processors, further cause the one or more processors to:
identify the network associated with the first user device;
determine one or more trust-score factors based on the network analysis of the information regarding the network; and
generate the first trust-score based on the one or more trust-score factors.

10. The non-transitory computer-readable medium of claim 7, where the one or more instructions, when executed by the one or more processors, further cause the one or more processors to:
receive user information associated with the first user of the first user device;
determine one or more trust-score factors based on the user information associated with the first user of the first user device; and
generate the first trust-score based on the one or more trust-score factors.

11. The non-transitory computer-readable medium of claim 7, where the one or more instructions, when executed by the one or more processors, further cause the one or more processors to:
access user device information regarding the first user device;
determine one or more trust-score factors based on the user device information; and
generate the first trust-score based on the one or more trust-score factors.

12. The non-transitory computer-readable medium of claim 7, where the one or more instructions, when executed by the one or more processors, further cause the one or more processors to:
determine a minimum trust-score based on the first trust-score and the one or more second trust-scores;
determine that the minimum trust-score satisfies a security level threshold; and
change the security level based on the minimum trust-score satisfying the security level threshold.

13. A method, comprising:
receiving, by a device, a first request to establish a collaboration session from a first user associated with a first user device;
authenticating, by the device, the first user to establish the collaboration session;
access information regarding a network associated with the first user device,
    the information regarding the network identifying one or more properties associated with the network;
perform a network analysis on the information regarding the network;
generating, by the device, a first trust-score associated with the collaboration session and the first user, based on authenticating the first user and based on the network analysis of the information regarding the network, the first trust-score being associated with a first security level for the collaboration session, and
the first trust-score being determined based on one or more first trust-score factors;
establishing, by the device, the collaboration session based on the first trust-score;
assigning, by the device, the first user to a session role, associated with the collaboration session, based on the first trust-score;
receiving, by the device, a second request for the collaboration session;
authenticating, by the device, a second user for the collaboration session based on the second request;
generating, by the device, a second trust-score, associated with the collaboration session, based on authenticating the second user,
the second trust-score being associated with a second security level for the collaboration session,
the second security level being different than the first security level;
providing, by the device and to the first user device associated with the first user, first information associated with the collaboration session, based on the first security level for the collaboration session,
the first information associated with the collaboration session including information identifying a set of user capabilities,
the set of user capabilities being associated with the first security level;
providing, by the device and to a second user device associated with the second user, second information associated with the collaboration session, based on the second security level for the collaboration session,
the second information being different than the first information based on the second security level being different than the first security level;
monitoring, by the device and during the collaboration session, the network to detect an adjustment to the one or more properties associated with the network;
determining, by the device and during the collaboration session, a new first trust-score based on detecting the adjustment;
changing, by the device and during the collaboration session, the first security level for the collaboration session based on the new first trust-score; and
reconfiguring, by the device, the collaboration session based on the change to the first security level.

14. The method of claim 13, further comprising:
applying a tag to information being provided via the collaboration session based on a source for the information; and
providing an indication of the tag to the first user and the second user.

15. The method of claim 13, further comprising:
providing a first screen-view associated with the collaboration session to the first user device,
the first screen-view including a first particular set of information and a first particular set of user capabilities;
determining a second screen-view associated with the collaboration session based on another session role assigned to the second user; and
providing the second screen-view associated with the collaboration session to the second user device,
the second screen-view including a second particular set of information and a second particular set of user capabilities,
the second particular set of information being different from the first particular set of information, and
the second particular set of user capabilities being different from the first particular set of user capabilities.

16. The method of claim 13, further comprising:
determining network information associated with the first user device; and
generating the first trust-score based on the network information.

17. The method of claim 13, further comprising:
determining that a particular trust-score factor, of one or more trust-score factors, has changed; and
calculating the first trust-score, as a recalculated trust-score, based on determining that the particular trust-score factor has changed.

18. The method of claim 13, further comprising:
assigning the second user to another session role associated with the collaboration session; and
providing, to the second user device, the second information associated with the collaboration session based on the other session role.

19. The device of claim 1, where the one or more processors are further to:
determine network information associated with the first user device; and
generate the first trust-score based on the network information.

20. The non-transitory computer-readable medium of claim 7, where the one or more instructions, when executed by the one or more processors, further cause the one or more processors to:
determine network information associated with the first user device; and
generate the first trust-score based on the network information.

* * * * *